June 18, 1935.  N. C. RUBIN  2,005,051
MECHANICAL MOVEMENT
Filed April 15, 1933   3 Sheets-Sheet 3

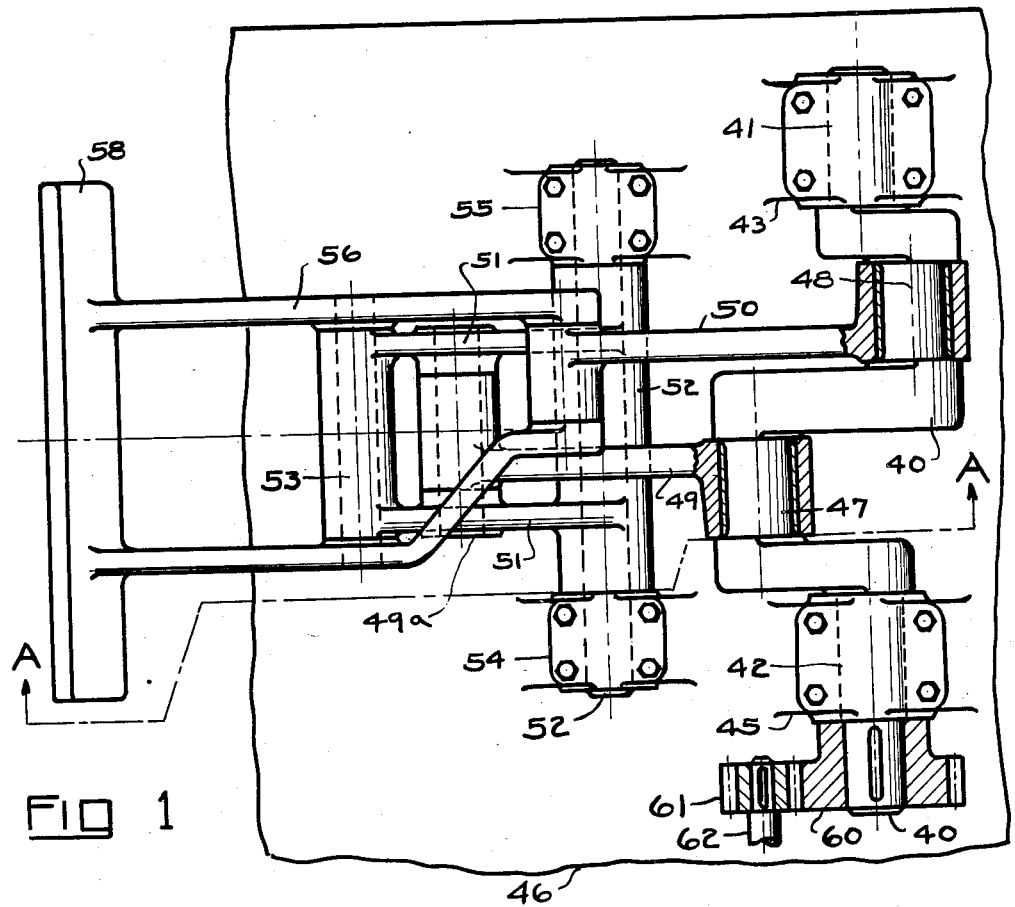

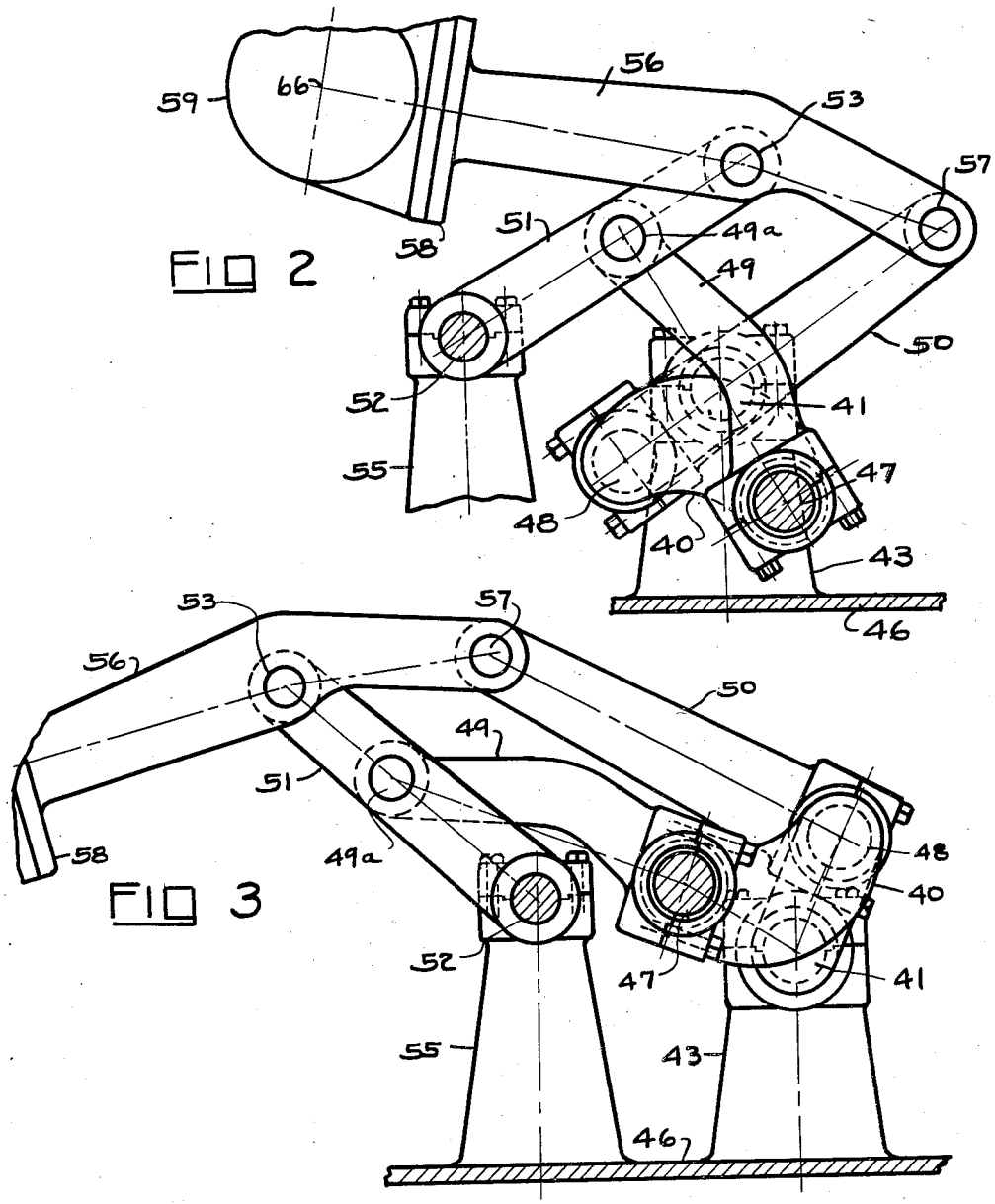

INVENTOR
NORBERT C. RUBIN
BY George V. Woodling.
ATTORNEY

Patented June 18, 1935

2,005,051

UNITED STATES PATENT OFFICE 2,005,051

MECHANICAL MOVEMENT

Norbert C. Rubin, Cleveland, Ohio, assignor to The McKinney Tool and Manufacturing Company, Cleveland, Ohio, a corporation of Ohio Application April 15, 1933, Serial No. 666,337

23 Claims. (Cl. 74—1)

My invention relates in general to a mechanical movement and more in particular to a movement that transfers a rotary motion into a modified path of travel.

An object of my invention is to provide a mechanical movement that moves a point on a driven member downwardly, then laterally along a substantially straight line and then upwardly in an arcuate manner to its elevated initial position.

Another object of my invention is to provide a movement that causes a point on a driven member to trace a box-like outline, the point starting from, and returning to, its initial position at a retarded rate of velocity.

Another object of my invention is to provide for so modifying the rotary movement of a crank and the box-like movement of a driven member so that the driven member has a dwell period at only one position of the crank.

Another object of my invention is to provide a linkage system having driving and driven members, which automatically retains the driven members in a rest position when no power is applied to the driving member.

My mechanical movement, while it has many useful applications, is particularly useful to support a saw, which, when carried on the driven member of the linkage system travels in a box-like path. This box-like movement first lowers the saw into working engagement with the stock; then forces the saw substantially in a straight line through relatively wide sheets of the stock, and then the box-like movement elevates the saw from the stock, and returns it to its elevated starting position. Therefore, another object of my invention is to provide a linkage system that controls this passing of a saw through relatively wide pieces of stock.

With these and other objects in view, my invention consists in the construction, arrangements and combination of the various parts of my linkage system, whereby the objects contemplated are obtained as hereinafter more fully set forth, pointed out in my claims, and illustrated in the accompanying drawings, in which:

Figure 1 is a plan view of my mechanical movement, portions being broken away to illustrate various features of my invention;

Figure 2 is a similar view to that of Figure 3, but with the operating portions thereof shown in a different operative position;

Figure 3 is a section of my mechanical movement, taken along the line A—A of Figure 1;

Figure 4:
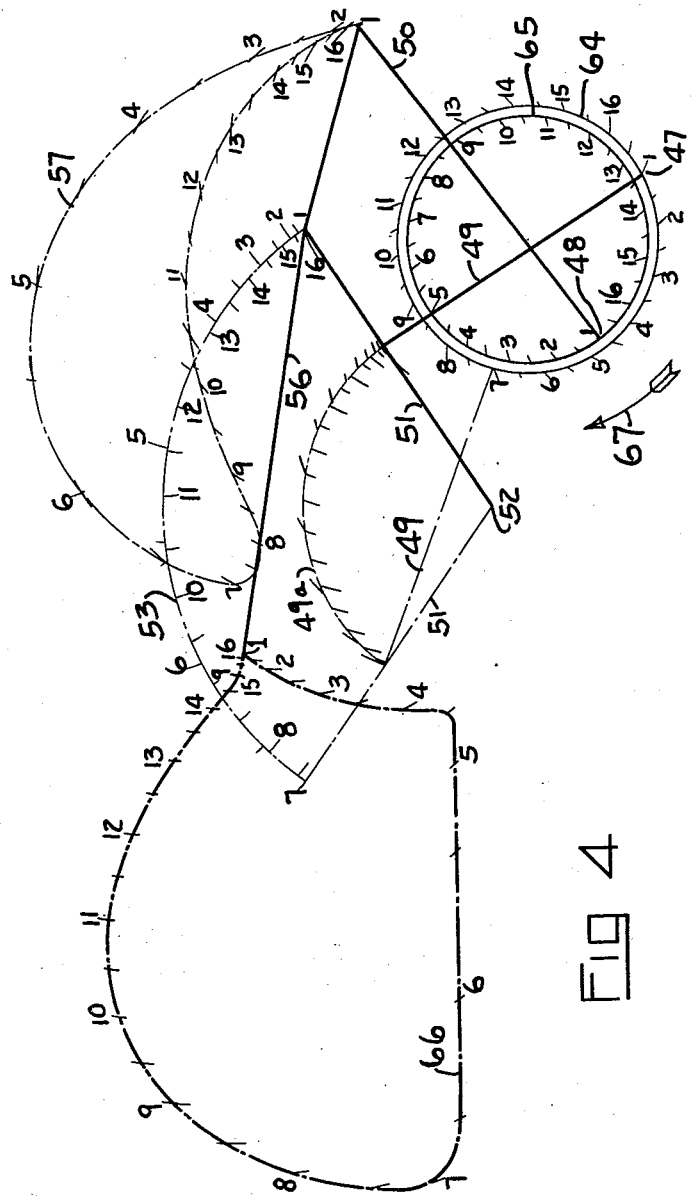
Figure 4 is a diagrammatic chart illustrating various operating positions of the mechanism.

With reference to the drawings, (particularly Figs. 1, 2 and 3) my invention comprises a crank shaft 40, journaled for rotation in bearings 41 and 42, formed in brackets 43 and 45, which extend upwardly and form a part of a base plate 46. The shaft 40 is provided with cranks 47 and 48. On the crank 47 is rotatably mounted one end of a link 50. To the swinging end of the link 49, and pivoted for rocking motion on a pin 49A therein, is a lever 51 pivoted at one of its ends for rocking motion about a shaft 52, and disposed at its other end to carry a pin 53. The lever 51 passes bifurcatedly over its associated end of the link 49 and is formed at both extreme ends into hubs, which engage the pin 53 and the shaft 52 respectively. As a support for the shaft 52, I extend it outwardly beyond each side of the lever 51, and into fixed engagement with the brackets 54 and 55 which extend upwardly from, and form a part of, the base 46. While I have indicated these brackets as having capped connections with the shaft 52, so that the shaft 52 can not rotate, thus making the lever 51 rockable about the stationary shaft, it is apparent that the shaft, as a modification, can be fixed into the lever 51 and made rockable in the brackets.

Extending through each side of the lever 51, the pin 53 passes into fixed engagement with and at a point intermediate the ends of the yoked sides of a lever 56. The rearward extension of the lever 56 is yoked-over and connected to the end of the link 50. A pin 57 passes for rocking movement through the yoked-connection and extends on each side thereof into fixed engagement into the associated walls of the lever 56. The forward extension of the lever 56 terminates in a cross-plate 58. To this plate may be fastened such mechanism as the link motion may be designed to support and move. For purposes of illustration I have indicated a motor 59, (see Fig. 2) suitably fastened to the cross-plate 58, which may be utilized to drive a rotary saw and other similar devices.

As a means of driving the mechanism, I have indicated in Figure 1 a gear 60 keyed to a projecting end of the shaft 40. Meshing with this is a pinion 61 carried by a shaft 62. While I have shown no bearing support for this shaft 62, it may be of any conventional arrangement. Thus, it may be in a bracket extending from the base 46, or it may be included in a housing (not shown) that could be arranged over this gear train. A motor may be connected to the shaft 62, or a line shaft drive can be used, or the drive can be made direct to the crank shaft, as special occasion may require.

The operation of the mechanism is as follows: When power is applied from a motor or line shaft in any desired manner to gears 60 and 61, the crankshaft 40 rotates and actuates the system of levers.

Referring to Figure 4, I have diagrammatically shown the different working positions of the links and levers. The path of the crank 47 is indicated by the circle 64 and the path of the crank 48 by the circle 65. Each circle is divided into 32 equal divisions formed by points numbered from 1 to 16. The linkage is at rest when the cranks are both at their point 1 positions, indicated by full lines in Figure 4, this also being the position of Figure 2. The cranks rotate in the direction as indicated by the arrow 67. For purposes of simplicity I have used the numerals 1 to 16 as position indications. For instance, the numeral 1 designates a certain position of crank 47 and of crank 48, the same numeral is then used to indicate the resultant positions of pins 49A, 53, 57, 47 and 48. For purposes of illustration the center of the motor 59 is indicated by a point 66 and its various positions are traced in Figure 4. As the cranks revolve, pins 49A and 53 move in arcuate paths about pin 52. The pin 57 moves thru a curved semielliptical path, one end of the path being somewhat pointed. The pin 66 moves through a path which first descends as indicated by points 1 to 4½, then moves in a substantially horizontal line between points 4½ to 6½, and then swings upwardly in an arcuate manner through the points 6½ to 16 to the starting position at point 1. If a saw, (not shown) were mounted upon the motor shaft, its center would coincide with the point 66. In the case of sawing through wide stock sections, the advantages of this box-like movement of the point 66 is readily apparent. The saw, by virtue of this box-like movement, first descends into working engagement with the stock, passes through the stock, and then rises and returns to its starting position. I have not shown the saw and the stock as they form no part of my present invention. My present invention covers a linkage system that transfers a circular crank motion into a driven box-like motion. Many occasions arise where a movement of this kind is desirable and my disclosure of a motor, and references to a saw are made only to indicate one of these occasions.

It will also be seen in Figure 4, that my linkage system modifies the usual crank motion of deceleration and acceleration at each end of the stroke to like effects at one point only in the travel of the point 66. In other words the point 66 decelerates to, and accelerates from, its dwell position of numeral 1. It will also be seen that, with the arrangement in the dwell position of Figure 2, the downward load effect in lever 56 incident to the weight of the motor 59 produces tension in the member 50 and compression in member 49. In this position no movement can be induced in the crank shaft 40 by the weight of the motor 59 and therefore, the crank shaft is automatically locked against gravitational rotation when no power is applied to the crank shaft.

It is also evident that certain adaptations of my mechanism may require that a clutch be interposed between the source of power and the gears 60 and 61. A clutch would enable the operator to release the shaft 40 from the power source at each return of the mechanism to the dwell period of Figure 2. Also, in the absence of a clutch, if the driving motive power were an electrical motor, it could be stopped by disconnecting the motor from the line. Or if a line shaft drive were employed, the belt could be shifted.

Some changes may be made in the arrangement and construction of my mechanism without departing from the real spirit and purpose of my invention and it is my intention to cover by my appended claims any modified forms of structure or use of mechanical equivalents, which may reasonably be included within their scope.

I claim as my invention:

1. In a linkage system, a crank shaft having cranks, means to rotate the shaft and cranks, a driven member, linkage connecting the said cranks with the said driven member operable upon the rotation of the crank to impart motion to the driven member, the said motion having only one position of dwell for each revolution of the crank.

2. In a linkage system, a crank shaft having at least one crank, means to rotate the shaft and crank, a driven member, linkage connecting the crank with the said driven member operable upon the rotation of the crank to impart motion to the driven member, the said motion having only one position of dwell for each revolution of the crank, said driven member being accelerated from and decelerated to the said dwell position.

3. In a linkage system, a crank shaft having a pair of cranks, means to rotate the shaft and cranks, a driven member, linkage connecting the said cranks with the said driven member operable upon the rotation of the crank to impart motion to the driven member, the said motion having only one position of dwell for each crank revolution, said driven member being accelerated from and decelerated to the said dwell position.

4. In a linkage system, a crank shaft having cranks, means to rotate the shaft, a driven member, and linkage connecting the cranks with the said driven member operable upon rotation of the crank shaft to impart a travel having a dwell position to a portion of the said driven member, said travel comprising moving downwardly from the dwell position, then outwardly in a substantially straight line and returning upwardly in an arcuate manner to the dwell position.

5. In a linkage system, a crank shaft having cranks, means to rotate the shaft and the cranks, a driven member, and linkage connecting the cranks with the said driven member operable upon rotation of the crank shaft to impart a travel having a dwell position to a portion of the said driven member, said travel comprising moving directly away from the dwell position, then changing the direction and continuing in a substantially straight line, then moving in an opposite direction from that of the initial movement and returning in an arcuate manner to the dwell position.

6. In a linkage system, a crank shaft having cranks, means to rotate the shaft and the cranks, a driven member, and linkage connecting the cranks with the said driven member operable upon rotation of the crank shaft to impart a travel having a dwell position to a portion of the said driven member, said travel comprising moving directly away from the dwell position, then changing the direction and continuing in a substantially straight line, then moving in a reverse direction in an arcuate manner to the dwell position.

7. In a linkage system, a crank shaft having cranks, means to rotate the shaft and the cranks, a driven member, and linkage connecting the cranks with the said driven member operable upon rotation of the crank shaft to impart a travel having a dwell position to a portion of the said driven member, said travel comprising moving directly away from the dwell position, then changing the direction and continuing in a substantially straight line, then returning in an arcuate manner to the dwell position.

8. In a linkage system, a crank shaft having two cranks, means to rotate the shaft and the cranks, a pivot, a first lever operable for movement about the pivot, means connecting one of the cranks with the first lever, a second lever pivoted for rocking movement upon the first lever, said second lever having a driven portion, and means connecting the second lever with the second crank, the crank shaft being operable, when rotated, to move the first and second levers about their pivots to impart a travel having a dwell position to said driven portion of the second lever, said travel comprising moving directly away from the dwell position, then changing the direction and continuing in a substantially straight line, then moving in an opposite direction from that of the initial movement and returning in an arcuate manner to the dwell position.

9. In a linkage system, a crank shaft having two cranks, means to rotate the shaft and the cranks, a pivot, a first lever operable for movement about the pivot, means connecting one of the cranks with the first lever, a second lever pivoted for rocking movement upon the first lever, said second lever having a driven portion, and means connecting the second lever with the second crank, the crank shaft being operable, when rotated, to move the first and second levers about their pivots to impart a travel having a dwell position to said driven portion of the second lever, said travel comprising moving away from the dwell position, then changing the direction and continuing in a substantially straight line, then returning in an arcuate manner to the dwell position.

10. In a linkage system, a crank shaft having two cranks, means to rotate the shaft and the cranks, a pivot, a first lever operable for movement about the pivot, means connecting one of the cranks with the first lever, a second lever pivoted for rocking movement upon the first lever, said second lever having a driven portion, and means connecting the second lever with the second crank, the crank shaft being operable, when rotated, to move the first and second levers about their pivots to impart a travel having a dwell position to said driven portion of the second lever, said travel comprising moving downwardly from a dwell position, then outwardly in a substantially straight line and returning upwardly in an arcuate manner to the dwell position.

11. In a linkage system, a crank shaft having a pair of cranks, means to rotate the shaft and cranks, a driven member, linkage connecting the said pair of cranks with the said driven member, and operable upon rotation of the crank shaft to impart a travel having a dwell position to a portion of the said driven member, said travel comprising moving downwardly, then outwardly in a substantially straight line and returning upwardly in an arcuate manner to the dwell position, said driven member being decelerated to and accelerated from the dwell position.

12. In a linkage mechanism, a crank shaft having a plurality of differently related cranks, means to rotate the crank shaft, a driven member, linkage connecting the cranks with the driven member, and operable upon rotation of the crank shaft to impart a travel to the driven member, said travel comprising moving in one direction, then changing the direction and continuing in a substantially straight line, and then continuing in a different direction in an arcuate manner.

13. In a linkage mechanism, a crank shaft having two cranks, means to rotate the crank shaft, a pivot, a first lever operable for movement about the pivot linkage connecting one of the cranks with the first lever, a second lever pivoted for rocking movement upon the first lever, said second lever having a driven portion, linkage connecting the said second lever to the other crank, the crank shaft being operable, when rotated, to impart a travel to the said driven portion of the second lever.

14. In a linkage mechanism, a crank shaft having two cranks, means to rotate the crankshaft, a pivotally mounted member, means connecting the said member to one of the cranks, a second member pivotally mounted upon the first member, means connecting the second member to the other crank, the crankshaft being operable when rotated, to impart a travel to the said second member.

15. In a linkage mechanism, a crankshaft having a plurality of differently related cranks, a driven member, linkage connecting the cranks to the driven member, means to rotate the crankshaft, the crankshaft being operable, when rotated, to impart a travel to the driven member, said travel comprising two lines of movement substantially perpendicular to each other and an arcuate line of movement connecting the ends of the said two lines of movement.

16. In a linkage mechanism, a crank shaft having a plurality of differently related cranks, a pivotally mounted driven member, linkage connecting the cranks to the driven member, means to rotate the crankshaft, the crankshaft being operable, when rotated, to impart a travel to the driven member, said travel including both an arcuate and a substantially straight line movement.

17. In a mechanical movement, a crankshaft having a plurality of differently related cranks, means to relate the crankshaft, a driven member, mechanism connecting the driven member to the cranks, the said mechanism and cranks being arranged to impart a travel to the driven member during rotation of the crankshaft, the said travel including a dwell position, a substantially straight line of movement, and an arcuate line of movement.

18. In a mechanical movement, a support, an oscillatory member pivotally mounted on the support, a second oscillatory member pivotally mounted at a point intermediate its ends on the first oscillatory member, a means to oscillate the first oscillatory member, and a second means to impart a non-circular motion to one end of the second oscillatory member.

19. In a mechanical movement, a support, a member pivotally mounted on the support, a second member pivotally mounted at a point intermediate its ends on the first member, a means to oscillate the first member, a second means to impart a non-circular motion to one end of the second member, the combination of the first and second members and the first and second means being arranged to impart a travel to the opposite end of the second member, said travel including both an arcuate and a substantially straight line movement.

20. In a mechanical movement, a support, a member pivotally mounted on the support, a second member pivotally mounted on the first member, a means to actuate the first member, a second means to effect a non-circular motion at a portion of the second member, the combination of the first and second members and the first and second means being adapted to effect a travel at another portion of the second member, the said travel including both an arcuate and a substantially straight line movement.

21. In a mechanical movement, a support, a member pivotally mounted on the support, a second member pivotally mounted at a point intermediate its ends on the first member, a means to actuate the first member, a second means to effect a non-circular motion at one end of the second member, the combination of the first and second members and the first and second means being arranged to effect a travel at the opposite end of the second member, the said travel including both an arcuate and a substantially straight line movement.

22. In a mechanical movement, a support, a member pivotally mounted on the support, a second member pivotally mounted at a point intermediate its ends on the first member, a means to oscillate the first member, a second means to actuate one end of the second member, the combination of the first and second members and the first and second means being arranged to effect a travel at the opposite end of the second member, the said travel including both an arcuate and a substantially straight line movement.

23. In a mechanical movement, a support, a member pivotally mounted on the support, a second member pivotally mounted on the first member, a means to actuate the first member, a second means to actuate the second member, the combination of the first and second members and the first and second means being arranged to effect a movement at a portion of the second member, the said movement including both an arcuate and a substantially straight line motion.

NORBERT C. RUBIN.